US009659445B2

(12) United States Patent
Friedman

(10) Patent No.: US 9,659,445 B2
(45) Date of Patent: May 23, 2017

(54) SLOT MACHINE WITH VARIABLE SUSPENSE FACTOR

(71) Applicant: Stacy Friedman, Beaverton, OR (US)

(72) Inventor: Stacy Friedman, Beaverton, OR (US)

(73) Assignee: Olympian Gaming, LLC, Lake Oswego, OR (US)

( * ) Notice: Subject to any disclaimer, the term of this patent is extended or adjusted under 35 U.S.C. 154(b) by 513 days.

(21) Appl. No.: 14/141,330

(22) Filed: Dec. 26, 2013

(65) Prior Publication Data

US 2015/0187175 A1 Jul. 2, 2015
US 2015/0371497 A9 Dec. 24, 2015

Related U.S. Application Data

(63) Continuation of application No. 12/509,459, filed on Jul. 25, 2009, now abandoned.

(60) Provisional application No. 61/083,518, filed on Jul. 25, 2008.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ...... *G07F 17/3244* (2013.01); *G07F 17/3267* (2013.01); *G07F 17/34* (2013.01)

(58) Field of Classification Search
CPC . G07F 17/323; G07F 17/3265; G07F 17/3269
See application file for complete search history.

(56) References Cited

U.S. PATENT DOCUMENTS 5,934,672 A * 8/1999 Sines .................. G07F 17/3211 273/138.1
7,909,690 B2 * 3/2011 Low ........................ G07F 17/34 463/16
8,888,579 B2 * 11/2014 Beaulieu ......................... 463/20
9,171,425 B2 * 10/2015 Lauzon ................... G07F 17/34
2007/0178959 A1 * 8/2007 Halprin ................... G07F 17/34 463/20
2008/0045302 A1 * 2/2008 Low ........................ G07F 17/34 463/20

* cited by examiner

*Primary Examiner* — Milap Shah
*Assistant Examiner* — Jason Pinheiro
(74) *Attorney, Agent, or Firm* — Muskin & Farmer LLC

(57) ABSTRACT

A slot machine which can be adjusted to alter the suspense level without changing the mathematics of the gameplay. By evaluating the final outcome before the reels stop spinning, the order in which the reels stop may be adjusted to either increase or decrease the level of suspense for the player, when compared with the standard left-to-right order.

20 Claims, 10 Drawing Sheets

SLOT MACHINE WITH VARIABLE SUSPENSE FACTOR

CROSS REFERENCE TO RELATED APPLICATIONS

This application claims benefit to provisional application 61/083,518, filed in the USPTO on Jul. 25, 2008, entitled, “Slot Machine with Variable Suspense” which is incorporated by reference herein in its entirety.

BACKGROUND OF THE INVENTION

Field of the Invention

The present general inventive concept is directed to a method, apparatus, and computer readable storage medium directed to a slot machine game with a variable level of player suspense.

Description of the Related Art

Slot machine games are a very popular form of casino gaming. A typical electromechanical slot machine game displays wagering outcomes by spinning and then stopping (or “resolving”), three physical reels containing images (symbols) alternated with blanks. Specifically, after a player initiates gameplay, the software operating the machine uses a pseudo-random number generator to determine the final positions of the three reels, then sets the reels spinning. After a short period of time, the reels are stopped in their determined positions. The reels are resolved, one at a time, from left-to-right. The relationship of the symbols on the reels to a payline determines whether an outcome is a winner or loser.

Most winning outcomes require three matching symbols on the payline. Conversely, most losing outcomes contain one or more blanks, or two or more unlike symbols. Due to the physical shape of a slot reel and the viewing window through which it is seen, it is possible to see at least one symbol above and below the payline. A “near miss” on a slot machine is a losing outcome which appears to have nearly been a winner. A near miss may occur by achieving two like symbols and a third unmatched symbol, or may occur by virtue of the position of the winning symbols being just above or just below the payline. For example, the outcome 7-7-7 (on reels 1 (leftmost), 2 (center), and 3 (rightmost), respectively) may be a winner on a slot machine game, and the outcome 7-7-blank may be a loser. FIG. 2 shows the outcome 7-blank-7: the first and third 7 symbols 115 and 125 on the left and right reels 110 and 130 both intersect the payline 105; however, the second seven symbol 135 on the center reel 120 is above payline 105. Thus, FIG. 2 shows a near miss outcome. Typically, a near miss is a losing outcome (though it may be a smaller winning outcome than was otherwise expected).

The virtual reel technology described in U.S. Pat. No. 4,448,419 to Telnaes teaches how to create “weighted” reels, where the symbols on the reels do not appear with equal probability. With weighted reels, it becomes possible to increase the chance of a near miss by increasing the frequency of the blank space immediately above or below a symbol. For example, the probability of the outcome depicted in FIG. 2 herein may be increased by increasing the number of virtual blanks above or below the 7 symbol 135 on the center reel 130. The “symbol ratio” is the ratio of the virtual weight of a blank space to an adjacent symbol. A high symbol ratio will create more near misses. The technique of more heavily weighting the blanks above and below a valuable symbol is also known as “clustering”.

Near misses have the impact of creating excitement and suspense for slot players as they may perceive that a win almost happened. However, an excess of near misses may lead players to believe the game is rigged or malfunctioning. To prevent this, some regulated gambling jurisdictions require that the symbol ratio for jackpot symbols must not exceed a certain limit.

U.S. Pat. No. 5,584,764 to Inoue describes a multi-line video slot machine game using a grid of 3×3 individual reels (reels that show one symbol each). Inoue teaches that the “hope of winning”, or suspense of a slot game with multiple intersecting paylines may be increased by resolving the reel with the greatest number of intersecting lines last. In the 3×3 game of Inoue, the second resolution order of FIG. 10 teaches that the middle reel should be resolved last, as it intersects four paylines. In contrast, the traditional, “in-order” resolution order of Inoue’s FIG. 9 last resolves a symbol which only intersects three paylines. While Inoue’s “resolve the middle reel last” approach may increase the suspense for a 3×3 grid slot machine, in a standard 3-reel slot game, all three reels intersect the same payline(s). Therefore, resolving the middle (center) reel last would not have Inoue’s desired effect, and indeed may actually decrease the suspense of a typical slot machine game since most games have more virtual blank spaces on the rightmost reel than the center. Further, the visibility of symbols above and below the payline in a standard slot machine is not present in the game of Inoue, and Inoue does not address the presence of symbols outside his “observation windows”. Therefore, what is needed is a better way to increase the suspense of a standard slot machine game.

At the same time, psychological studies on slot machine players and near misses have shown near misses to be very compelling and exciting, much more so than other losing outcomes that are not near misses. This fact led Universal Distributing, in the 1980s, to design a series of slot machine games which detected if a losing outcome would occur, and if so, would replace that losing outcome with a near miss losing outcome. This practice was known as near miss programming. Mathematically, the results were identical since both outcomes were losing outcomes. However, the practice of near miss programming, that is, substituting one losing outcome with another when that other outcome was not actually selected by the random number generator, was ruled deceptive and made illegal during a series of Nevada Gaming Commission hearings in 1988. Those hearings led to the amendment of Nevada Gaming Commission Regulation 14.040, which now states: “All gaming devices submitted for approval: (3) Must display an accurate representation of the game outcome. After selection of the game outcome, the gaming device must not make a variable secondary decision which affects the result shown to the player.”

Notwithstanding this regulation, there is still some level of suspicion about the fairness of near misses even when not specifically programmed; that is, when achieved due to clustering techniques on weighted virtual reels. It may be that regulators will weigh future evidence and rule against the practice of virtual reels and clustering. For example, Dr. Kevin A. Harrigan has published several papers in mental health journals that indicate the virtual reel technology and near misses may lead to “classical and operant conditioning, the frustration effect, the perception of early wins, illusion of control, biased evaluation of outcomes, entrapment, and irrational thinking.” (Harrigan, Kevin A. (2007). Slot Machines: Pursuing Responsible Gaming Practices for Virtual Reels and Near Misses. *International Journal of Mental*

*Health and Addiction*, DOI 10.1007/s11469-007-9139-8). It is possible that such additional studies on near misses may lead regulators to want to decrease near misses by eliminating the practice of virtual reels, or decrease them even further beyond what is possible with uniformly-weighted reels. Therefore, what is also needed is a way to decrease the suspense of a standard slot machine game.

In addition, what is also needed is a new variation of slot machine game which players should find more exciting and which should generate additional action for the casino.

SUMMARY OF THE INVENTION

It is an aspect of the present invention to provide flexibility and innovations in casino game play.

The above aspects can be obtained by a method for adjusting the suspense of a slot machine game comprising the steps of (a) accepting a player wager, (b) spinning a plurality of slot reels, (c) identifying a final position of the reels, (d) evaluating a game outcome based on the final position, (e) choosing a suspense factor, (f) computing an order of reel resolution based on the desired suspense factor and the game outcome, (g) resolving the reels according to the order of reel resolution, and (h) crediting to the player based on the game outcome.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
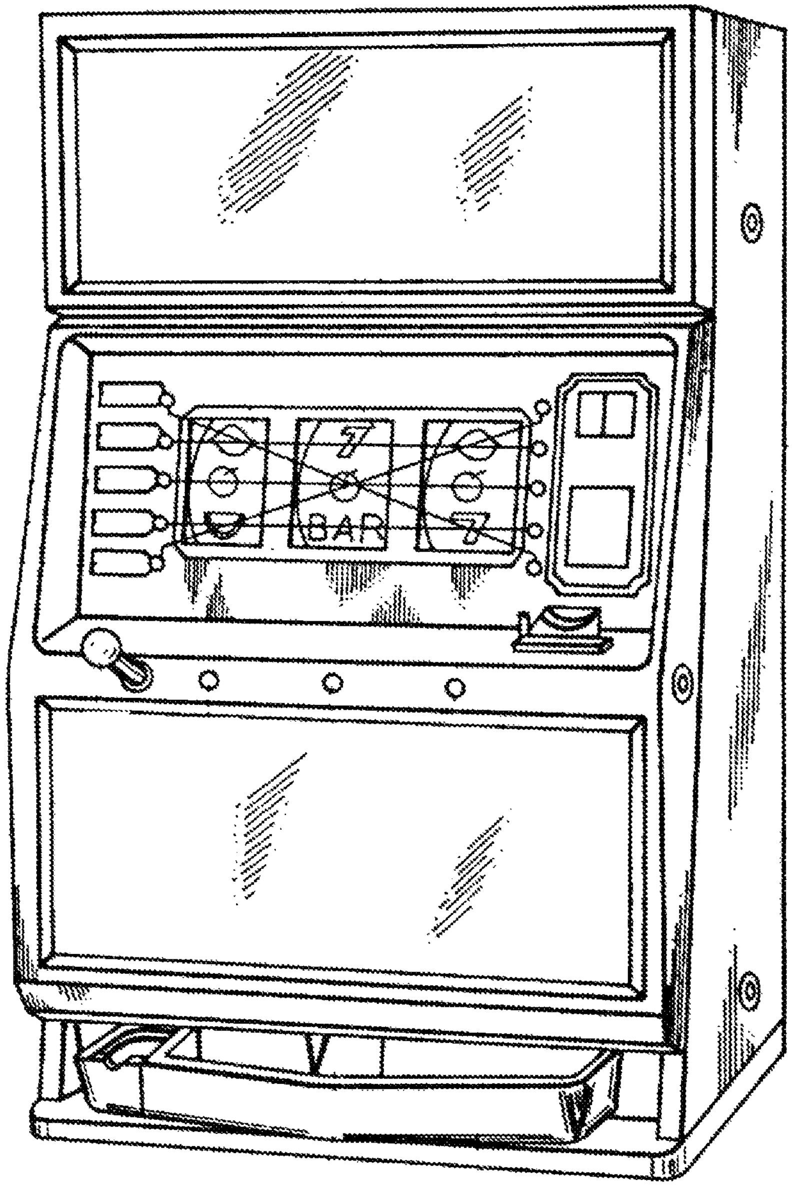
FIG. 1 is an example of a slot machine of a type used herein, according to an embodiment.

Reference will now be made in detail to the presently preferred embodiments of the invention, examples of which are illustrated in the accompanying drawings, wherein like reference numerals refer to like elements throughout.

The present inventive concept relates to a method, apparatus, and computer readable storage medium to implement a slot machine game with a variable level of suspense.

FIG. 1 is an example of a slot machine of a type used herein, according to an embodiment. In addition to mechanical slot machines, video slot machines (not pictured) can be used as well.

The reel resolution order of a slot machine play can be said to be a vector or N-tuple mapping the reels of the machine to the desired order of resolution. For example, in a 3-reel game, a resolution order of {2, 3, 1} indicates that the $2^{nd}$ reel should be resolved first, followed by the $3^{rd}$ reel and finally the $1^{st}$ reel. This naturally expands to any number of reels. The normal resolution order of a typical 3-reel game is {1, 2, 3}.

The level of suspense of a slot machine play is based on how long it takes for a player to realize the play is a winner or a loser, and also potentially to realize how much the play has won. If a 3-reel single-line slot machine play is determined to be a losing outcome, and the leftmost reel resolves to a blank while the other two reels are still spinning (and a blank is never part of a winning outcome), then the suspense is low—it was possible to know the outcome (a loss) after the leftmost reel was resolved. In contrast, if a slot machine play is determined to be a winning outcome, and the left and center reels resolve to 7 symbols while the right reel is still spinning, then the suspense is high. The losing outcome will not be known by the player until the third and final reel has resolved. Quantitatively, the "suspense factor" for a slot machine play can be the number of resolved reels required to know the outcome of the play, and the average suspense factor for an overall slot machine can be derived by evaluating the suspense factor across all possible outcomes. Also, the suspense factor can be evaluated as a function of the resolution order, the symbols to be shown, and the paytable for the game.

Because a suspenseful game is more exciting, slot machine manufacturers design slot game mathematics to increase excitement. In addition to using the symbol ratio method described above, most mechanical slot game models feature fewer virtual blank weighting on the left reel and more blank weighting on the right reel. Thus, the likelihood of a non-blank symbol on the left reel is higher than on the right reel, and the likelihood of a blank on the right reel is higher than on the left reel. This is especially relevant to near misses, because a near miss on the left reel—that is, where the blank appears on the left reel payline, followed by two matching symbols on the center and right reels—is far less suspenseful and exciting than a near miss on the right reel. A near miss on the left reel can be called an "early" near miss, while a near miss on the right reel can be called a "late" near miss, again because the reels resolve in left-to-right order {1, 2, 3}. Weighting the blanks differently across the three reels, as described herein, leads to a relatively greater number of late near misses when compared to an equal distribution of blanks across all reels. Early near misses are far less exciting and suspenseful than late near misses.

Figure 2:
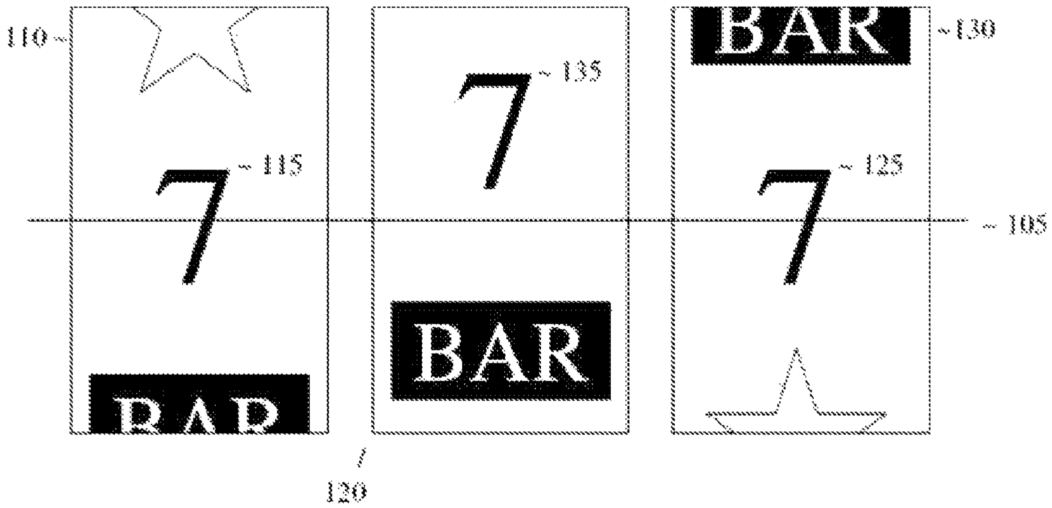
FIG. 2 is an illustration of an exemplary slot machine reel outcome, according to an embodiment.

FIG. 2 shows a typical 3-reel game outcome, in this case 7-blank-7. The game consists of reels 110, 120, and 130. The game includes symbols including stars, bars, and sevens (as well as blank spaces). Typically, if three like non-blank symbols align on the payline 105, that will be a winning outcome. FIG. 2 therefore depicts a losing outcome, since the seven symbols 115 and 125 on the left reel 110 and right reel 130 lie on the payline 105, but the seven symbol 135 on the center reel 120 does not.

In a typical slot machine game, the outcome of FIG. 2 would always resolve in the same left to right order—that is, after the three reels 110, 120, and 130 had started spinning, reel 110 would stop (or resolve) first, then reel 120 would resolve, then reel 130 would resolve. This corresponds to a resolution order of {1, 2, 3}. The present invention contemplates dynamically changing the order of reel resolution to fulfill a target suspense level. Importantly, this change can be accomplished without requiring any adjustment in the underlying mathematics of the game, thereby avoiding the re-engineering work required to produce and validate a new mathematical game model. This method also potentially avoids the significant cost and time of gaming jurisdiction regulatory approvals which is always required for new game mathematics.

Figure 3A:
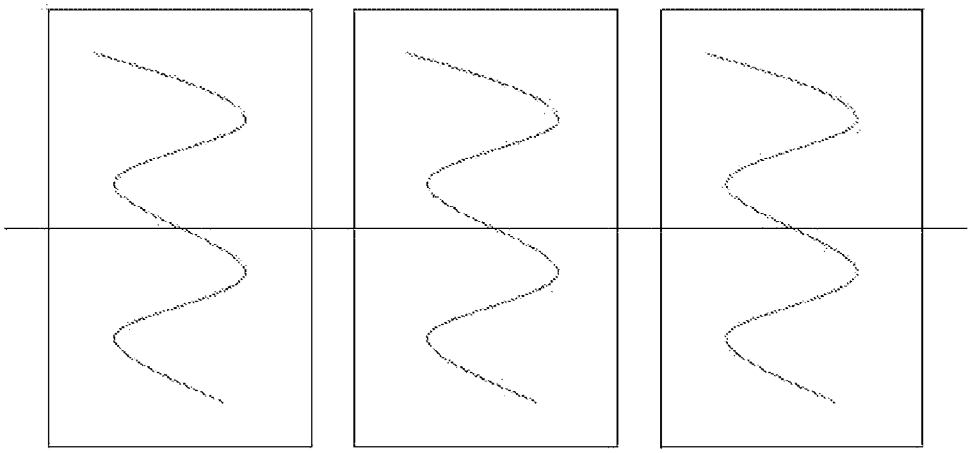
FIG. 3A is an illustration of an initial spin of a maximum-suspense example game, according to an embodiment.

FIG. 3A is an illustration of an initial spin of a maximum-suspense example game, according to an embodiment. Typically, all reels are initially spinning simultaneously for a small duration.

Figure 3B:
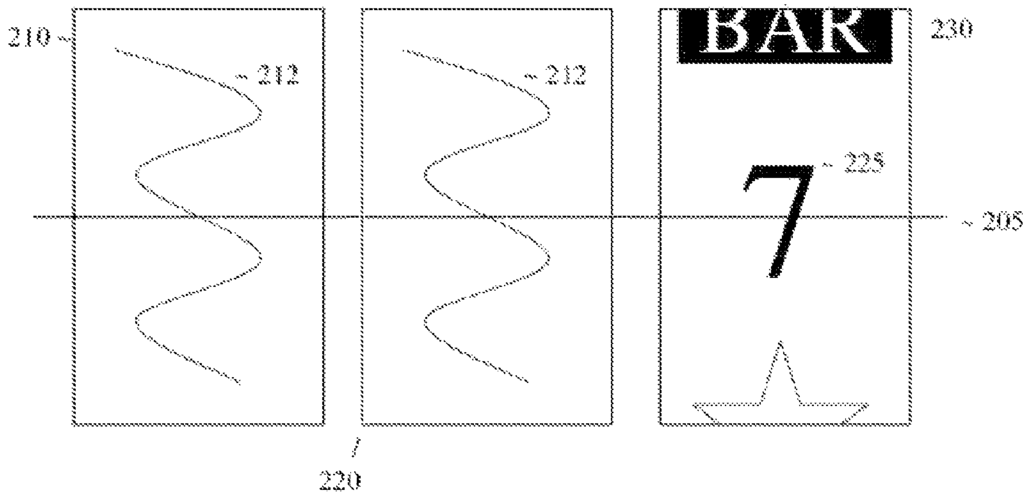
FIG. 3B is an illustration of a first stage of a maximum-suspense example game, according to an embodiment.

FIG. 3B shows a step in the resolution of the same outcome depicted in FIG. 2, as resolved according to a suspense-maximizing order. At this point, the machine has already evaluated the final position as 7-blank-7, a losing outcome. There are therefore three possible suspense factors for this outcome. If the resolution order is {1, 3, 2} or {3, 1, 2}, the suspense factor will be 3. If the resolution order is {2, 1, 3} or {2, 3, 1}, the suspense factor will be 1 (under the assumption that a blank never forms part of a winning outcome). If the resolution order is {1, 2, 3} or {3, 2, 1}, the suspense factor will be 2, under the same assumption. If the desire is to maximize suspense, the machine will select the highest suspense factor available, 3, and resolve the blank on the middle reel 220 last using one of the resolution orders {1, 3, 2} or {3, 1, 2}. In FIG. 3B, the wavy lines 212 on reels 210 and 220 illustrate that reels 210 and 220 are still spinning (i.e. this represents resolution order {3, 1, 2} or {3, 2, 1}). Reel 230 has resolved first and the corresponding seven symbol 225 is shown on the payline 205.

Figure 3C:
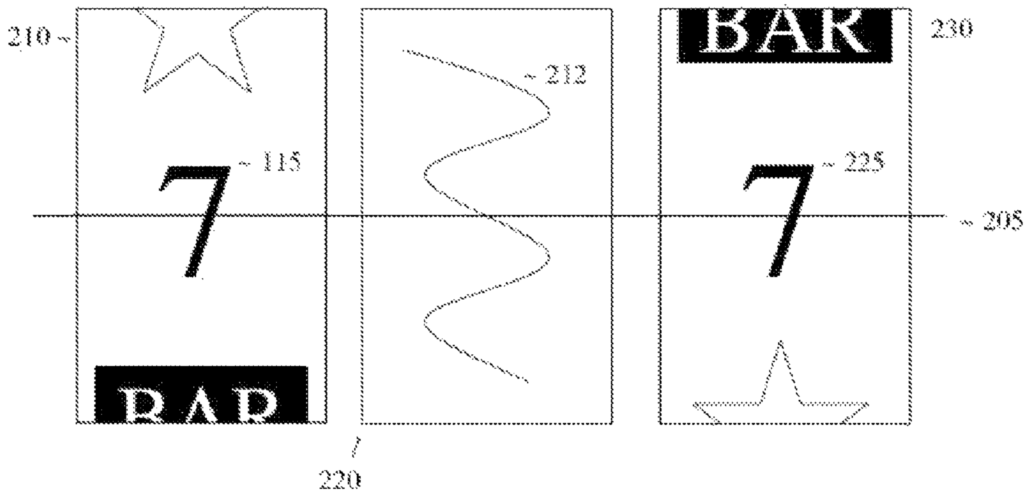
FIG. 3C is an illustration of a second stage of a maximum-suspense example game, according to an embodiment.

FIG. 3C shows a second step in a maximum-suspense resolution of the outcome of FIG. 2, after reel 210 has resolved. At this point, two sevens 115 and 225 are showing on the payline 205, while the center reel 220 is still spinning.

Figure 3D:
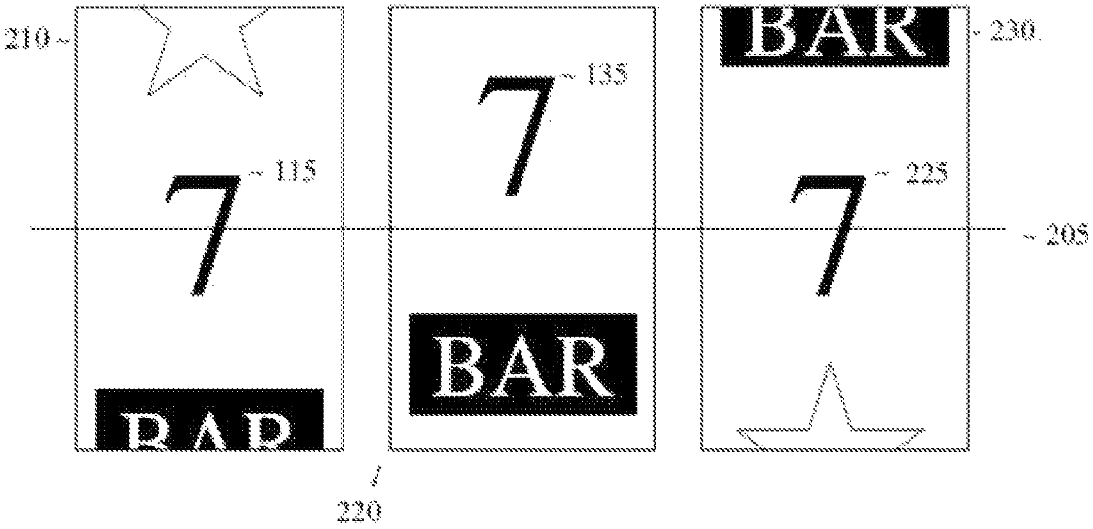
FIG. 3D is an illustration of a third stage of a maximum-suspense example game, according to an embodiment.

FIG. 3D shows a third step in the maximum-suspense resolution of the outcome of FIG. 1, after all three reels have resolved. The center reel 220 has now resolved to the blank symbol, while the seven symbol 135 not on the payline 205. Thus, identity of the outcome, a loss, was revealed after the third reel had resolved for a suspense factor of 3.

Figure 4A:
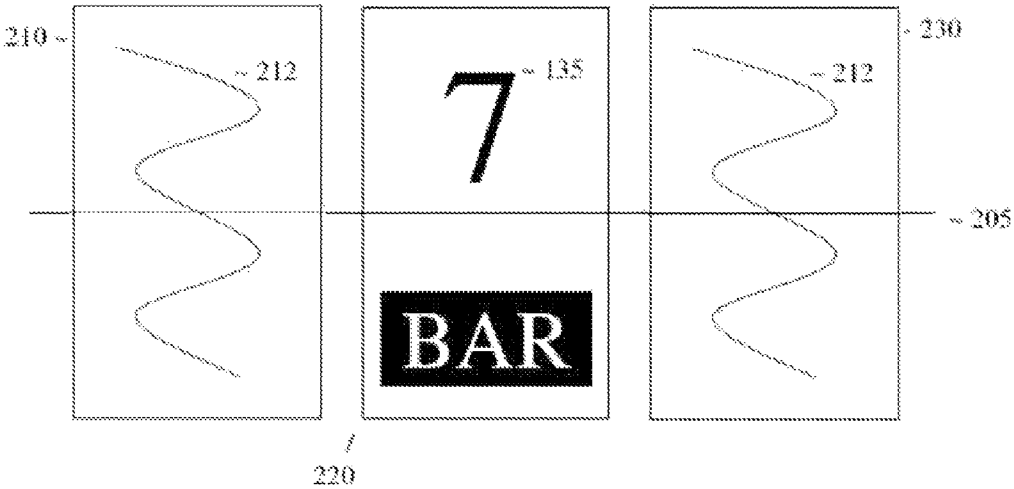
FIG. 4A is an illustration of a first stage of a minimum-suspense example game, according to an embodiment.

FIG. 4A shows a first step in a minimum-suspense resolution of the outcome of FIG. 2. In this case, the lowest possible suspense factor is desired, so the machine will select the suspense factor of 1 for this outcome and one of the low-suspense resolution orders {2, 1, 3} or {2, 3, 1}. Therefore, the first reel to resolve (after all three reels spin for a short period of time) is middle reel 220, which shows a blank on the payline 205 and therefore reveals a losing outcome while reels 210 and 230 are still spinning (as depicted by wavy lines 212).

Figure 4B:
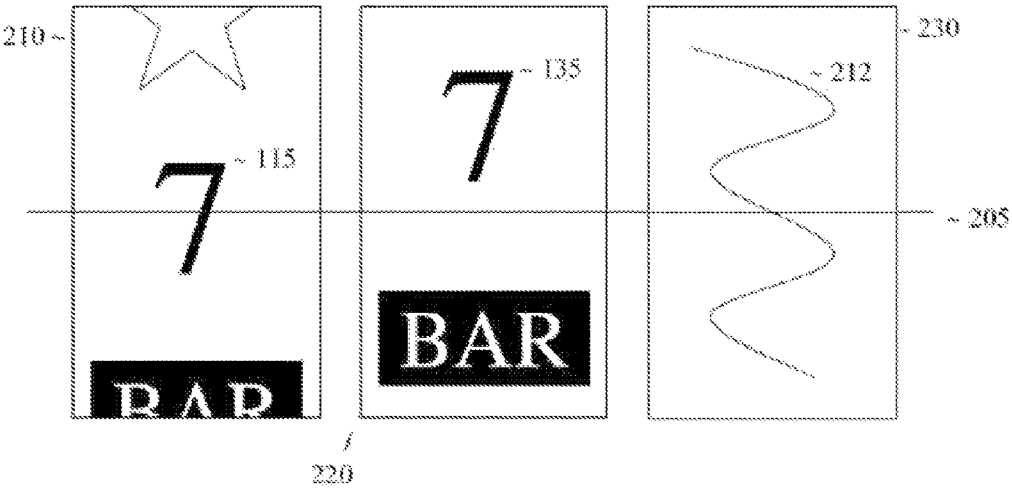
FIG. 4B is an illustration of a second stage of a minimum-suspense example game, according to an embodiment.
Figure 4C:
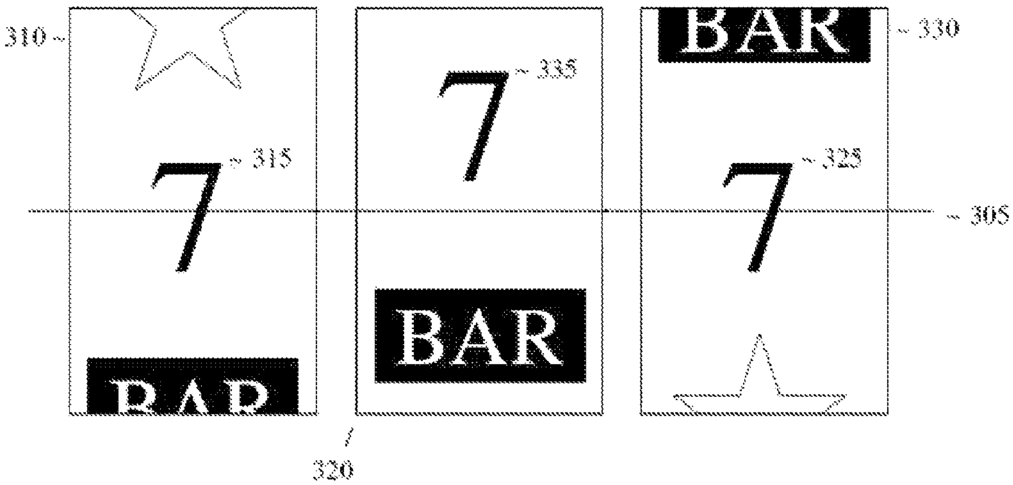
FIG. 4C is an illustration of a third stage of a minimum-suspense example game, according to an embodiment.

FIGS. 4B and 4C show second and third steps in a minimum-suspense resolution of the outcome of FIG. 2, but as the losing outcome is already known to the player after reel 220 has resolved, the resolution of the final two reels is not exciting.

When the player's knowledge of an outcome cannot be affected by changing the resolution order, this can be called an immutable outcome. An outcome such as 7-7-7 is immutable since resolving the reels in any order will yield the same knowledge at the same time by the player. In the case an outcome is immutable, the resolution order may be chosen based on a random selection or may be predetermined and fixed (e.g. always {1, 2, 3}). Also, the resolution order for such an outcome may be chosen based on making the overall distribution of resolution order frequency fit a certain distribution (e.g. roughly equal, or biased toward right-reel-last, etc.). For example, it may be the case that, given the desired suspense of the game, it is more likely for losing outcomes to be resolved {2, 3, 1} or {3, 2, 1} than any other order. In this example, the immutable outcomes can be resolved in other orders, so as to "balance out" the overall resolution order for the whole game.

Not all winning outcomes are immutable. For example, some games award pays on mixed-symbol combinations, such as any combination of single, double, and triple bars. In that case, while the combination single bar-single bar-single bar would be immutable, the combination single bar-single bar-double bar would not be.

An alternate way to evaluate a suspense factor is as a vector, or N-tuple of values, each of which is based on the Nth reel to resolve as well as the possible awards given the reels which have already resolved. For example, in the combination single bar-single bar-double bar (from left-to-right), the suspense factor is higher under resolution order {1, 2, 3} than under {3, 2, 1}. Under {3, 2, 1} after two reels have resolved, the outcome may be a loser or may be a mixed-bar award, but cannot be three single bars. However, under {1, 2, 3} after two reels have resolved, the outcome may be three single bars as well. Since the three single bars typically pays more than a three mixed bar outcome, the suspense factor would be higher resolving as {1, 2, 3}, even though the number of reels to know the outcome is 3 in both cases. In this example, even after the first two reels resolved, the outcome could still have been a winner or loser if the last symbol were matched or not. Thus, by expressing the suspense factor as a vector based on an evaluation or aggregation of which awards are possible after the Nth symbol has been revealed, the distinction can be made between two resolution orders that have the same "time to know the outcome" but nevertheless have different levels of suspense based on how valuable those possible outcomes are. Additionally, the suspense factor vector as described herein can be reduced to a scalar value by application of a mathematical function, such as an average, a weighted average, a sum, etc.

Thus, and as previously stated, the suspense factor for a game outcome can be a function of the resolution order, the symbols in the game outcome, and the game paytable. The resolution order can be a function of the predetermined symbols that are to be displayed on each of the reels (the game outcome) and the paytable.

The actual resolution order can be determined in numerous ways. For example, if the maximum suspense factor is desired, then the method can cycle through all permutations of possible resolution orders (the number of resolution orders would be the factorial of the number of reels, e.g., in a 3-reel game there would be 3! (six) possible resolution orders), and pick the resolution order that maximizes the suspense factor based on any of the calculation methods described herein (e.g. the number of reels to know the outcome, an evaluation including the amount of the potential win after the Nth reel is known, etc.). If there is more than one such resolution order, then the particular resolution order can be picked at random from the possible resolution orders, or can be weighted to achieve an overall desired distribution of resolution order frequency. For example, in a 3-reel game with six possible resolution orders, if it is desired to equalize the overall frequency of each of the six orders yet the suspense evaluations result in that orders starting with reel 3 to occur more frequently, then when a random selection of possible resolution orders can occur, it may more frequently pick an order that does not start with reel 3.

Additionally, the suspense factor may be evaluated for an entire game by applying the game outcome suspense factor described herein to all possible game outcomes. This can be done based on a weighted average by evaluating the probability and suspense factor for each possible game outcome, or by another method.

FIGS. 5A, 5B, 5C, 5D, and 5E are drawings illustrating examples of various payline structures, according to an embodiment. The methods described herein can be applied to any number of paylines with any number of reels.

Figure 5A:
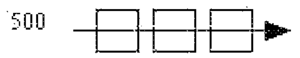
FIGS. 5A, 5B, 5C, 5D, and 5E are drawings illustrating examples of various payline structures, according to an embodiment.
Figure 5B:
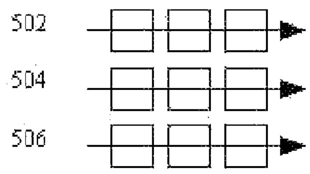
Figure 5C:
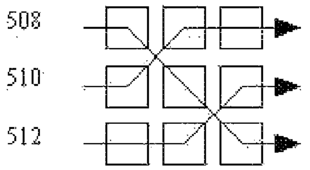
Figure 5D:
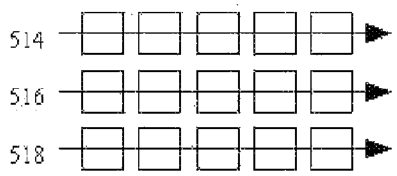
Figure 5E:
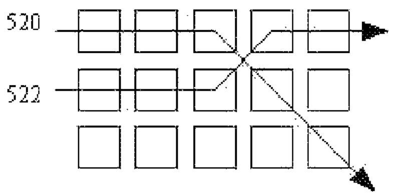

FIG. 5A shows a simple 3-reel, one payline 500 structure. FIG. 5B shows a 3-reel, simple three horizontal payline (502, 504, 506) structure. FIG. 5C shows a 3-reel game with three non-horizontal paylines (508, 510, 512). FIG. 5D shows a 5-reel game with three horizontal paylines (514, 516, 518). FIG. 5E shows a 5-reel game with two non-horizontal paylines (520,522). These are all merely examples, and any arbitrary paylines (or all possible paylines) can be used. It is also common for 3-reel games to have the paylines shown in FIG. 5B plus two diagonal paylines, such as payline 508 from FIG. 5C. Paylines for 5-reel games often have dozens of paylines criss-crossing the reels. As known in the art, symbols falling on active paylines are paid according to the respective wager on each payline. Active paylines are selected and paid for before the player spins.

In a further embodiment, expected value of outcomes in progress can be used to determine the resolution order. It may be desirable to have the player perceive that he or she might win a highest award while the reels are resolving. For example, consider the example paytable in Table I, for a 3-reel one line game. Also, for purposes of example, each reel in this game uses an identical reel strip of five stops: cherry/wild/blank/blank/blank.

TABLE I

| Combination | Payout | Probability | Expected value |
|---|---|---|---|
| 3 wild symbols | 50 | 0.008 | 0.4 |
| 3 cherry symbols | 25 | 0.008 | 0.2 |
| 3 mixed cherry/wild | 5 | 0.048 | 0.24 |
| All others | 0 (loss) | 0.936 | 0 |
| Total return | | | 0.84 |

Table II represents a conditional expected value chart after one reel has stopped spinning with the symbol shown, but two reels remain spinning.

TABLE II

| Left reel | Middle reel | Right reel | Expected value |
|---|---|---|---|
| Wild | Unresolved | Unresolved | 2.6 |
| Cherry | Unresolved | Unresolved | 1.6 |
| Blank | Unresolved | Unresolved | 0 |
| Unresolved | Wild | Unresolved | 2.6 |
| Unresolved | Cherry | Unresolved | 1.6 |
| Unresolved | Blank | Unresolved | 0 |
| Unresolved | Unresolved | Wild | 2.6 |
| Unresolved | Unresolved | Cherry | 1.6 |
| Unresolved | Unresolved | Blank | 0 |

Table III below is a conditional expected value chart after two reels have stopped spinning with the symbols shown, but one reel remains spinning.

TABLE III

| Left reel | Middle reel | Right reel | Expected value |
|---|---|---|---|
| Wild | Wild | Unresolved | 11 |
| Wild | Cherry | Unresolved | 2 |
| Wild | Blank | Unresolved | 0 |
| Cherry | Cherry | Unresolved | 6 |
| Cherry | Wild | Unresolved | 2 |
| Cherry | Blank | Unresolved | 0 |
| Blank | Wild | Unresolved | 0 |
| Blank | Cherry | Unresolved | 0 |
| Blank | Blank | Unresolved | 0 |
| Unresolved | Wild | Wild | 11 |
| Unresolved | Wild | Cherry | 2 |
| Unresolved | Wild | Blank | 0 |
| Unresolved | Cherry | Cherry | 6 |
| Unresolved | Cherry | Wild | 2 |
| Unresolved | Cherry | Blank | 0 |
| Unresolved | Blank | Wild | 0 |
| Unresolved | Blank | Cherry | 0 |
| Unresolved | Blank | Blank | 0 |
| Wild | Unresolved | Wild | 11 |
| Wild | Unresolved | Cherry | 2 |
| Wild | Unresolved | Blank | 0 |
| Cherry | Unresolved | Cherry | 6 |
| Cherry | Unresolved | Wild | 2 |
| Cherry | Unresolved | Blank | 0 |
| Blank | Unresolved | Wild | 0 |
| Blank | Unresolved | Cherry | 0 |
| Blank | Unresolved | blank | 0 |

Now consider an example, wherein a random result is determined by a slot machine to be (in left to right order): blank/cherry/wild, which is a losing combination. The prior art resolution order would be from left to right, which would display the blank first, thereby causing the player to become disinterested. In an algorithm which maximizes expected value for each successive reel resolved, then the first reel to resolve would be the one that has the maximum expected value, which would be the wild in the third column with an expected value of 2.6. Of the remaining two reels to resolve, the middle one (cherry) has an subsequent expected value of 2 while the left reel (blank) has an expected value of 0, therefore the middle reel is resolved next, and the left reel (blank) is resolved last.

In another embodiment, the resolution order can be determined by working backwards, that is determining which two reels (of a 3-reel game, or N−1 reels of an N-reel game) when displayed create the highest expected value. Then of those two reels, choose the first reel to resolve either randomly or based on which of the two has the highest expected value. This order may not always be identical to the order in the prior paragraph. For example, consider the following paytable in table IV, with three identical reel strips of: 7/cherry/blank/blank/blank.

TABLE IV

| Combination | Payout |
|---|---|
| Three 7 symbols | 100 |
| Three cherry symbols | 5 |
| all others | 0 |

If the random result is determined to be cherry/7/cherry, then by using the highest expected value method, the first reel to be resolved would be the middle reel showing a 7 symbol. However, after resolving the next reel (either the left or right), the player realizes that he or she has lost. This may nevertheless be desirable if the impact of the 7 appearing first is sufficiently exciting to overcome the realization that the play is a loser when the second reel resolves. However, using the "working backwards" expected value method, the two reels with the highest expected value are determined, in this case that is the left and right reels, since it is a possible outcome for the player to get a cherry in the middle reel and win a payout (even though this isn't what happens in this play). As between the left and right reels, the first reel to be resolved can be determined randomly or by which symbol has the highest initial expected value (in this case, they are the same), and then the other reel can be resolved, and then finally, the middle reel can be resolved which shows that the player has lost. Using this method, the player's suspense lasts longer (two reels) than by displaying the 7 first (wherein the suspense lasts for one reel). Compare the method of resolving the left and right reel before the middle reel with the prior art method of resolving the reels left to right: In the latter method, after seeing two reels (cherry/7/unresolved) the player knows that he or she has lost. In the former method, after seeing two reels (cherry/unresolved/cherry), the player thinks he still may have a chance of winning something. And in the case where the final outcome is cherry/cherry/cherry (a winner), the selected resolution order may also lead to the first two reels showing (cherry/unresolved/cherry), thus not tipping off the player that a losing outcome is necessarily coming.

The methods described herein to determine the resolve order using expected value can be applied to games with multiple paylines. The expected values can be computed using all active paylines using the respective wagered amounts on each payline, by using only the highest wagered payline, by using only the middle payline, etc.

Figure 6:
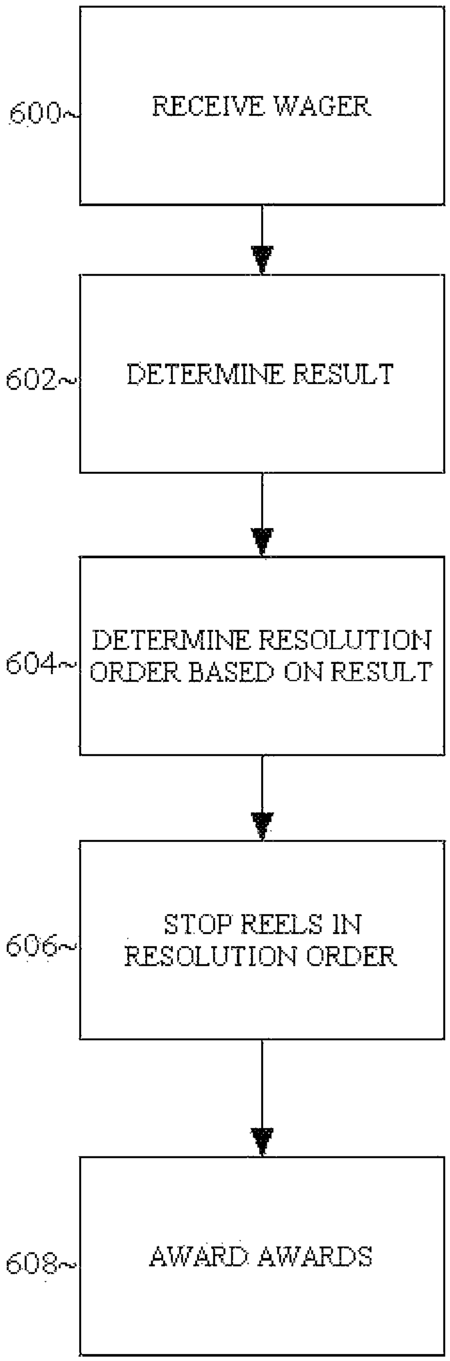
FIG. 6 is a flowchart illustrating an exemplary method of implementing a slot machine with an adjusted resolution order, according to an embodiment.

FIG. 6 is a flowchart illustrating an exemplary method of implementing a slot machine with an adjusted resolution order, according to an embodiment.

The method can begin with operation 600, which receives a wager. This can be done as known in the art, wherein a player first funds the machine by placing coin, cash, ticket, or a card into the slot machine to add credits to the credit meter. The player then sets his or her wager based on a number of chosen paylines, wager amount, etc., and then presses a 'spin' button on the machine (or on older machines, pulls a handle), which deducts a respective amount of credits from the credit meter in order to play the game and then spins the reels.

From operation 600, the method proceeds to operation 602, which determines the result. Typically, results of a slot machine spin are determined before or during the actual reel spin. The results can be determined using a random number generator and the optional use of weighted reels. For example, see U.S. Pat. No. 4,448,419 to Telnaes, which is incorporated by reference herein in its entirety. The results are determined but not yet shown to the player.

From operation 602, the method proceeds to operation 604, which determines the resolution order using the result determined in 602. The active paytable for the spin can also be used on conjunction with the determined result in order to determine the resolution order. The resolution order can be determined using any method described herein.

From operation 604, the method proceeds to operation 606, which then actually stops the reels from spinning in the resolution order determined in operation 604. For example, if (in a 3-reel game), the resolution order is determined to be rightmost reel, leftmost reel, center reel (or {3, 1, 2} as described above) then the slot machine would spin all three reels and first stop the rightmost reel, then stop the leftmost reel, then finally stop the center reel.

From operation 606, the method proceeds to operation 608, which determines if the result determined in operation 602 (and displayed to the player in operation 606) entitles the player to an award (based on the results and the paytable), and if so, then the machine will credit the player with the entitled award, otherwise the player will win nothing.

In a further embodiment, instead of adjusting the resolution order so that the reels stop in an order other than left to right, the outcomes of each reel can be rearranged so that the reels will stop in the customary left to right order, but the actual positions of each reel will have been rearranged. For example, suppose a predetermined result of a 3-reel, one line game is blank/seven/seven, and using any of the methods described herein it is determined that to achieve the desired suspense level that the resolution order should be {2, 3, 1}. Instead of resolving the reels in this order, the determined symbol of the center reel (seven) can be displayed on the left reel, the determined symbol of the right reel (seven) can be displayed on the middle reel, and the determined symbol of the left reel (blank) can be displayed on the right reel. Thus, the reels can now resolve in left to right order and show the following symbols from left to right: seven/seven/blank. In this manner, the reels can still stop in the traditional left to right order but can nevertheless have been subject to rearrangement in order to increase suspense.

The "rearranging" or "transposition" method would typically work only if the paytable being used is not order specific, and similarly also only if all the symbols exist on all three reels. For example, some paytables may pay if a symbol (e.g., cherry) is on the leftmost reel position only, or some games have a bonus triggering symbol on the 3rd (rightmost) reel only. This would be an order-specific paytable. Ideally, the rearrangement would move the entire reel result, though unless all of the reel strips are identical, it may not be possible to transpose other than the symbol which actually intersects the payline. For example, if the mechanical (or video) reels in a game have 22 stops, and the right reel position (e.g., stop 12) is moved to the left reel position, then the left reel position would stop on stop 12 and would look exactly how the right reel would have looked had it not been moved. Thus symbols above or below the result of the reel would not be different after rearrangement. This example assumes that the reel strips are identical for each of the reels. If they are not, but nevertheless all symbols exist on all reels, then it will still be possible to transpose on-the-payline symbols from one reel to another; however, the symbols above and below the payline may be different than they would have been had they not been transposed One optional feature of implementing the methods herein is to control how often the reel resolution order is adjusted based on an evaluation of the outcome. For example, if the reel resolution order is adjusted every time in order to maximize the suspense factor on each spin, then the player may grow accustomed to seeing the losing reel spin last and the suspense enhancement may wear off over time (or may cause frustration). Therefore, the reel resolution order may be adjusted some, but not all, of the time.

For example, the reel resolution order can be in the standard left to right order (or alternately in a totally random order), but in X % (e.g., X=40) of the time, based on a trigger of a random variable between 0% and 100% not exceeding X %, the resolution order would be selected using any of the methods described herein to increase the suspense of the player. In another embodiment, in a 3-reel game, X % of the time the resolution will be unchanged, Y % of the time the resolution order will resolve with a suspense factor of 3, and Z % of the time the resolution order will resolve with a suspense factor of 2. In this way, the suspense can be enhanced without "over-enhancing" it on every play. Similarly, suspense can be decreased by the methods described herein, but the effect of that decrease can be mitigated by randomly (some percentage of the time) not using a suspense-decreasing reel order but a pre-set order or a random order instead.

Figure 7:
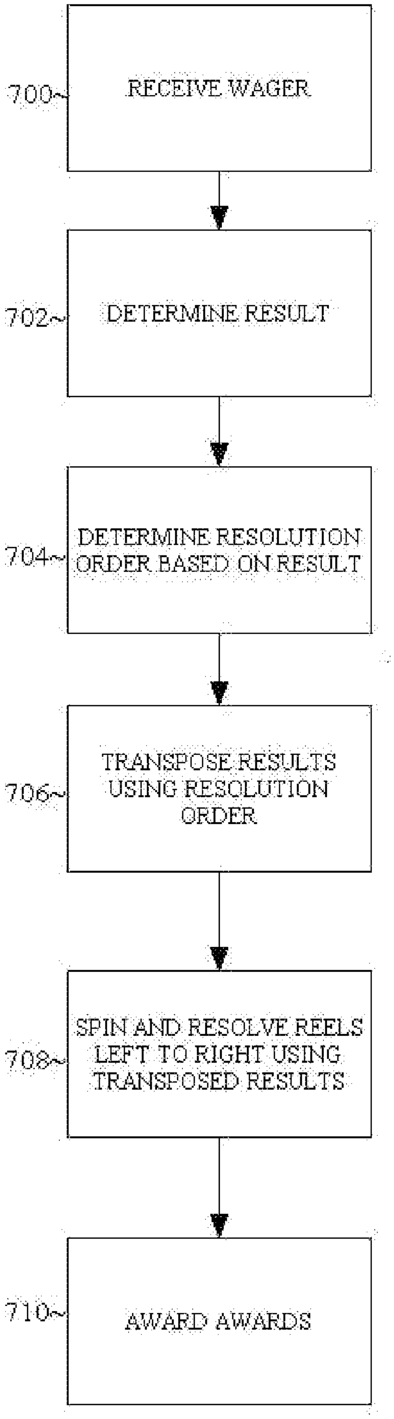
FIG. 7 is a flowchart illustrating an exemplary method of implementing a slot machine with transposed reels based on an resolution order, according to an embodiment.

FIG. 7 is a flowchart illustrating an exemplary method of implementing a slot machine with transposed reels based on a determined resolution order, according to an embodiment.

The method can begin with operation 700, which receives a wager from a player. This can be done as described herein and known in the art.

From operation 700, the method proceeds to operation 702, which determines the end result of the spin (prior to the reels being resolved). This can be done as described herein and known in the art.

From operation 702, the method proceeds to operation 704, which determines a resolution order based on the result determined in operation 702. This can be done using any of the methods described herein.

From operation 704, the method proceeds to operation 706, which transposes the results determined in operation 702 using the resolution order determined in operation 704. For example, consider the result in operation 702 is determined to be (stop #21, stop #14, stop #8), wherein stop numbers are a physical stop number on each reel mapped to a symbol (or blank between symbols). Consider also that the resolution order determined in operation 704 is {3,2,1}, in other words the rightmost reel will stop first, then the middle reel then the leftmost reel will stop. The results determined in operation 702 can be transposed to be: (stop #8, stop #14, stop #21), which is determined by rearranged the determined results in the resolution order to conform with a target resolution order, in this case {1, 2, 3}.

From operation 706, the method can proceed to operation 708, wherein the reels are spun and resolved from left to right (the target order of {1, 2, 3}), but the positions of the reels when they stop are now going to be the transposed results determined in operation 706. Thus, compared to the method illustrated in FIG. 6, the actual symbols will be displayed in the same chronological order, but the method in FIG. 7 will cause them to always be displayed from left to right. As a result, the actual results displayed in FIG. 7 may not be identical to the results displayed in FIG. 6 since the reels may have been transposed. As an example, if the result of a spin is 7/blank/7, the method of FIG. 6 may result in a resolution order of {1, 3, 2}, while the method of FIG. 7 may result in reels 2 and 3 being transposed, and subsequently a resolution order of {1, 2, 3}. If the paytable being used is not order specific (e.g., the specific order of symbols in a winning combination does not affect the payout), then any difference in appearance would not change the player's overall win amount. Typically, identical reel strips on each reel should be used (on a mechanical slot machine) so that reel results on one reel can be perfectly replicated on a different reel.

Figure 8:
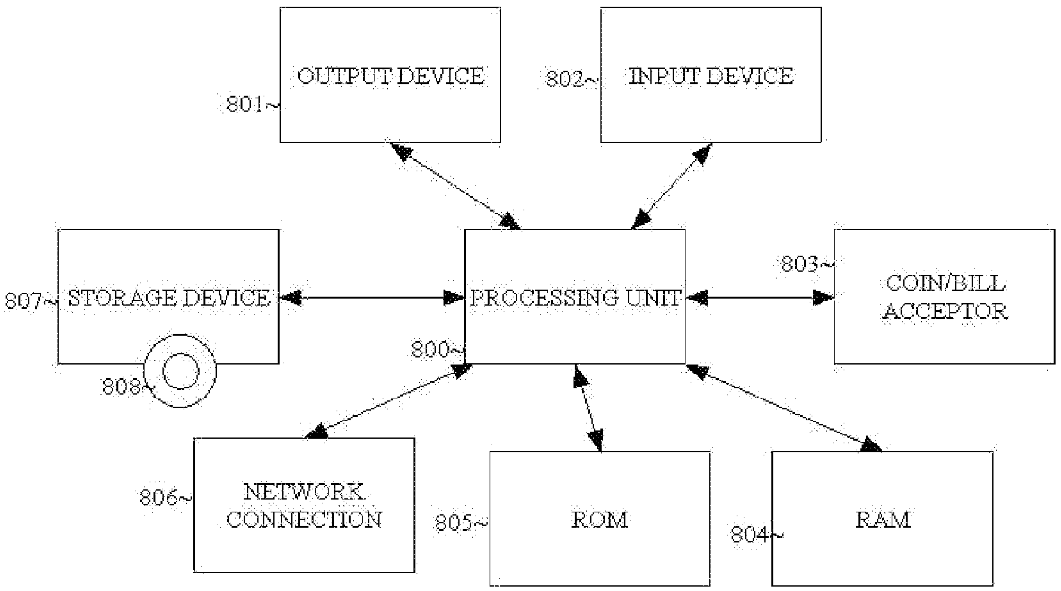
FIG. 8 is a block diagram illustrating hardware that can be used to implement an electronic gaming machine, according to an embodiment.

FIG. 8 is a block diagram illustrating hardware that can be used to implement an electronic gaming machine, according to an embodiment.

A processing unit 800 can be a microprocessor and any type of associated components (e.g., cache, bus, etc.) The microprocessor is connected (directly or indirectly) to an output device (e.g., touchscreen, speakers, reels, CRT, etc.) an input device (e.g., touchscreen, keyboard, mouse, etc.), a coin/bill acceptor 803 (which can also accept cashless tickets or electronically encoded payments cards), a RAM 804, a ROM 805, a network connection 806 (connecting the slot machine to any type of network such as a LAN, WAN, wifi, etc.), and a storage device 807 which can store programs and/or data to implement any of the methods described herein on a storage device 808.

It is also noted that any and/or all of the above embodiments, configurations, variations of the present invention described above can mixed and matched and used in any combination with one another. This also includes any prior document incorporated by reference, and any feature described herein can also be applied to any such documents. Any claim herein can be combined with any others (unless the results are nonsensical).

Moreover, any description of a component or embodiment herein also includes hardware, software, and configurations which already exist in the prior art and may be necessary to the operation of such component(s) or embodiment(s).

Further, the operations described herein can be performed in any sensible order. Any operations not required for proper operation can be optional. Further, all methods described herein can also be stored on a computer readable storage to control a computer.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An electronic gaming apparatus comprising:

an output device operable to display N slot machine reels; an input device;

a processor; and a non-transitory storage medium storing a paytable and instructions, wherein said instructions, when executed by the processor, cause the apparatus to perform the steps of:

determining at least one result symbol on each of a plurality of N slot machine reels;

determining an N−1-reel conditional expected value for each specific slot machine reel out of the N slot machine reels, wherein an N−1-reel conditional expected value is equivalent to an expected value of said specific slot machine reel being unresolved while each slot machine reel other than said specific slot machine reel has resolved to display respective at least one result symbols;

determining a last reel with a highest N−1-reel conditional expected value;

resolving all of the N slot machine reels except the last reel;

after the resolving all of the N slot machine reels except the last reel, resolving the last reel; and providing any rewards associated with result symbols on said resolved reels.

2. The apparatus of claim 1, wherein N is 3, wherein each slot machine reel has exactly one result symbol intersecting exactly one payline, and wherein the N−1-reel conditional expected values for each specific slot machine reel are further determined using said payline.

3. The apparatus of claim 1, wherein the N−1-reel conditional expected values are determined using active paylines and a respective wagered amount on each active payline.

4. The apparatus of claim 1, wherein the N−1-reel conditional expected values are determined using only a highest wagered payline.

5. The apparatus of claim 1, wherein the N−1-reel conditional expected values are determined using only a middle payline.

6. The apparatus of claim 1, wherein the apparatus further performs the steps of: after the determining of the last reel with a highest N−1-reel conditional expected value but before the resolving of all of the N slot machine reels except the last reel: determining an N−2-reel conditional expected value for each specific slot machine reel out of N−1 slot machine reels comprising all of the N slot machine reels except the last reel, wherein an N−2-reel conditional expected value is equivalent to an expected value of said specific slot machine reel and the last reel being unresolved while each slot machine reel in said N−1 slot machine reels other than said specific slot machine reel has resolved to display respective at least one result symbols; and determining a second-to-last reel with a highest N−2-reel conditional expected value; wherein resolving all of the N slot machine reels except the last reel further comprises: resolving all of the N slot machine reels except the last reel and the second-to-last reel; and after the resolving of all of the N slot machine reels except the last reel and the second-to-last reel, resolving the second-to-last reel.

7. The apparatus of claim 1, wherein if a plurality of reels have the highest N−1-reel conditional expected value, the last reel is determined randomly from said plurality.

8. The apparatus of claim 1, wherein if a plurality of reels have the highest N−1-reel conditional expected value, the last reel is determined from said plurality based on predetermined criteria.

9. An electronic gaming apparatus comprising:

an output device operable to display N slot machine reels;

an input device;

a processor; and a non-transitory storage medium storing a paytable and instructions, wherein said instructions, when executed by the processor, cause the apparatus to perform the steps of:

determining at least one result symbol on each of a plurality of N slot machine reels;

determining a 1-reel conditional expected value for each specific slot machine reel out of the N slot machine reels, wherein a 1-reel conditional expected value is equivalent to an expected value of said specific slot machine reel being resolved to display its respective at least one result symbol while each slot machine reel other than said specific slot machine reel is unresolved;

determining a first reel with a highest 1-reel conditional expected value;

resolving the first reel;

after resolving the first reel, resolving all of the N slot machine reels except the first reel; and providing any rewards associated with result symbols on said resolved reels.

10. The apparatus of claim 9, wherein N is 3, wherein each slot machine reel has exactly one result symbol intersecting exactly one payline, and wherein the 1-reel conditional expected values for each specific slot machine reel are further determined using said payline.

11. The apparatus of claim 9, wherein the 1-reel conditional expected values are determined using active paylines and a respective wagered amount on each active payline.

12. The apparatus of claim 9, wherein the 1-reel conditional expected values are determined using only a highest wagered payline.

13. The apparatus of claim 9, wherein the 1-reel conditional expected values are determined using only a middle payline.

14. The apparatus of claim 9, wherein the apparatus further performs the steps of: after the determining of the first reel with a highest 1-reel conditional expected value but before the resolving all of the N slot machine reels except the first reel: determining a 2-reel conditional expected value for each specific slot machine reel out of N−1 slot machine reels comprising all of the N slot machine reels except the first reel, wherein a 2-reel conditional expected value is equivalent to an expected value of said specific slot machine reel and the first reel being resolved to display their respective at least one result symbols while each slot machine reel in said N−1 slot machine reels other than said specific slot machine reel is unresolved; and determining a second reel with a highest 2-reel conditional expected value; wherein resolving all of the N slot machine reels further comprises: resolving the second reel; and after resolving the second reel, resolving all of the N slot machine reels except the first reel and the second reel.

15. The apparatus of claim 9, wherein if a plurality of reels have the highest 1-reel conditional expected value, the first reel is determined randomly from said plurality.

16. The apparatus of claim 9, wherein if a plurality of reels have the highest 1-reel conditional expected value, the first reel is determined from said plurality based on predetermined criteria.

17. An electronic gaming apparatus comprising:

an output device operable to display N slot machine reels;

an input device;

a processor; and a non-transitory storage medium storing a paytable and instructions, wherein said instructions, when executed by the processor, cause the apparatus to perform the steps of:

determining at least one result symbol on each of a plurality of N slot machine reels;

determining a 1-reel conditional expected value for each specific slot machine reel out of the N slot machine reels, wherein a 1-reel conditional expected value is equivalent to an expected value of said specific slot machine reel being resolved to display its respective at least one result symbol while each slot machine reel other than said specific slot machine reel is unresolved;

determining a first reel with a lowest 1-reel conditional expected value; resolving the first reel;

after resolving the first reel, resolving all of the N slot machine reels except the first reel; and providing any rewards associated with result symbols on said resolved reels.

18. The apparatus of claim 17, wherein N is 3, wherein each slot machine reel has exactly one result symbol intersecting exactly one payline, and wherein the 1-reel conditional expected values for each specific slot machine reel are further determined using said payline.

19. The apparatus of claim 17, wherein the 1-reel conditional expected values are determined using active paylines and a respective wagered amount on each active payline.

20. The apparatus of claim 17, wherein the 1-reel conditional expected values are determined using only a highest wagered payline.

* * * * *